2,996,461
ADHESIVE COMPRISING POLYMERIZABLE MONOMERIC MIXTURE, PEROXIDE, COBALT NAPHTHENATE, AND ETHYL CELLULOSE SORBATE

Martin H. Kaufman, China Lake, James J. Killackey, Los Angeles, and Paul K. Chung, China Lake, Calif., assignors to the United States of America as represented by the Secretary of the Navy
No Drawing. Filed Apr. 12, 1956, Ser. No. 577,897
2 Claims. (Cl. 260—17)
(Granted under Title 35, U.S. Code (1952), sec. 266)

The invention described herein may be manufactured and used by or for the Government of the United States of America for governmental purposes without the payment of any royalties thereon or therefor.

This invention relates to a composition for bonding articles made of fiber glass and polyester resin to articles made of the same or different material.

The invention has found particular application in the bonding of propellent compositions in the form of propellent grains to rocket motor tubes made of laminations of fiber glass bonded together by polyester resins.

A disadvantage attendant to the use of propellent grains in rocket motors is the fact that the grain shrinks in storage so that space is left between it and the rocket tube, thus causing breakage through handling. Fissures, cracks or breaks in the grain result in erratic burning so that control of the rocket's trajectory becomes difficult and the operation of the rocket in general is seriously affected.

The use of glass laminated rocket motor cases has accentuated the problem of bonding the propellent grain to the case, as it is difficult to bond the conventional propellent compositions to fiber glass laminated articles. Any bonding material used should also function as an inhibitor so that the expensive and time consuming step of providing the grain with an inhibitor coating is obviated.

It is therefore an object of this invention to provide a means for bonding a propellent grain to a rocket motor case.

It is another object of this invention to provide a bonding material for bonding a propellent grain to a rocket motor case, which also serves the function of an inhibitor.

It has been found that the above and other objects are accomplished by a formulation comprising from about 50 to about 85 volume percent of a carbonyl containing monomer such as vinyl acetate or methyl vinyl ketone; about 15 to about 50 volume percent of an acid monomer such as acrylic acid or methacrylic acid; a small amount of an unsaturated cellulosic cross-linking agent which is soluble in organic solvents, such as, ethyl cellulose sorbate, ethyl cellulose acrylate or cellulose acetate acrylate; a polymerization catalyst of the free radical type, such as, methyl ethyl ketone peroxide or benzoyl peroxide; and an accelerator, such as, cobalt naphthenate.

Various formulations of the bonding material of the invention were tested by bonding glass laminated polyester to N–4 propellant, a propellant having a nitrocellulose-nitroglycerin base. The polyester used in the glass laminate may be any conventional polyester used for this purpose. An example is a polyester made from phthalic anhydride, diethylene glycol and a small percentage of maleic anhydride. Styrene may be used depending upon the properties required. The adhesive formulation is effective so long as the polyester group is present in the bonding agent for the glass laminae. The propellent composition used is typical of nitrocellulose-nitroglycerin base propellants, and has the following composition:

| Component: | Content |
|---|---|
| Nitrocellulose | 51.5 |
| Nitroglycerin | 33.5 |
| Diethylphthalate | 10.9 |
| 2-nitrodiphenylamine | 2.0 |
| Lead stearate | 0.5 |
| Potassium sulfate | 1.5 |
| Carbon black | 0.1 |

The following are examples of formulations which were tested and which are illustrative of the invention but not limiting thereof:

Example I

| Component: | Content |
|---|---|
| Vinyl acetate | 65 vol. percent. |
| Acrylic acid | 35 vol. percent. |
| Cobalt naphthenate | 2 wt. percent based on monomer. |
| Methyl ethyl ketone peroxide | 2 wt. percent based on monomer. |
| Ethyl cellulose sorbate | 5.10 wt. percent based on monomer. |

After thorough mixing, the above formulation was applied to the internal surface of a tube made of glass laminated polyester of the type mentioned above. A section of N–4 propellant was then inserted in the tube and the formulation cured for three days at 60° C. The bond was tested by temperature cycling three times within a temperature range of −65° F. to +165° F. It was found that the propellent grain cracked due to internal stresses, but the glue line between tube and propellant was not affected by the temperature cycling. Ethyl cellulose sorbate is made by adding ethyl cellulose dissolved in ethyl acetate to sorbyl chloride, permitting the mixture to stand for about 48 hours and adding sodium carbonate to precipitate the polymer. The method of making the compound is fully disclosed in the copending application of Martin H. Kaufman, Serial No. 576,752, filed in the U.S. Patent Office on April 6, 1956, now abandonded, and entitled "Ethyl Cellulose Sorbate."

A 50–50 volume ratio of methyl vinyl ketone and acrylic acid with ethyl cellulose sorbate, methyl ethyl ketone peroxide, and cobalt naphthenate also gave an excellent bond.

Example II

| Component: | Content |
|---|---|
| Vinyl acetate | 85 vol. percent. |
| Acrylic acid | 15 vol. percent. |
| Methyl ethyl ketone peroxide | 5 wt. percent based on monomer. |
| Cobalt naphthenate | 2 wt. percent based on monomer. |
| Ethyl cellulose sorbate | 5–10 wt. percent based on monomer. |

Example III

| Component: | Content |
|---|---|
| Vinyl acetate | 50 vol. percent. |
| Methacrylic acid | 50 vol. percent. |
| Methyl ethyl ketone peroxide | 4 wt. percent based on monomer. |
| Cobalt naphthenate | 2 wt. percent based on monomer. |
| Ethyl cellulose sorbate | 5–10 wt. percent based on monomer. |

The formulations of Examples II and III were tested as agents for bonding propellent grains to tubes made of laminations of fiber glass bonded together by polyester resins, in the same manner in which the formulation of Example I was tested. Within the temperature range of −65° F. to +165° F. the glue line between the propellant and the tube was found to have greater strength than the propellant itself or the glass laminated polyester in all cases tested.

The above formulations provide excellent bonds for bonding glass laminated polyesters and other glass laminated polar polymers to each other. The bonds are formed at ambient temperatures in a very short time. In addition to the property of serving as bonding agents for propellent compositions, the formulations are good adhesives for bonding together glass laminations or bonding glass laminates to metal, cellulosics or other polar polymers. Copolymers of the above monomers or mixtures of the separate polymers from the above mentioned monomers in solution may be substituted for the monomers in the adhesive formulations where a solution type of adhesive can be used, that is, where the requirement that solvent be removed is consistent with the mode of operation.

The cured adhesive formulations were found to be good inhibitors for preventing erosive burning of the outer surface of the propellant grain during rocket operation.

Substitutes for various ingredients of the formulations may be used. For example, other cross-linking agents which may be substituted for ethyl cellulose sorbate are other unsaturated cellulosics soluble in organic solvents, preferably in the monomeric mixture. Examples of these are ethyl cellulose acrylate and cellulose acetate acrylate. The cellulosic cross-linking agent, ethyl cellulose sorbate, used in the above formulations also serves as a thickening agent and thus prevents rapid evaporation of volatile constituents. If a cross-linking agent is used which is not a thickener, such as, diallyl phthalate, a thickening agent, such as, polymethyl methacrylate or polyethyl acrylate must be added in an amount depending upon the viscosity required.

Obviously many modifications and variations of the present invention are possible in the light of the above teachings. It is therefore to be understood that within the scope of the appended claims the invention may be practiced otherwise than as specifically described.

What is claimed is:

1. An adhesive formulation comprising from about 50 to about 85 volume percent of a material from the class consisting of vinyl acetate and methyl vinyl ketone, from about 15 to about 50 volume percent of a material from the class consisting of acrylic acid and methacrylic acid, from about 2 to about 5 weight percent based on monomer content of methyl ethyl ketone peroxide, about 2 weight percent based on monomer content of cobalt naphthenate, and a sufficient amount of ethyl cellulose sorbate to form a viscous solution.

2. An adhesive composition for bonding nitroglycerin-nitrocellulose base propellants to other materials, comprising, from about 50 to about 85 volume percent of a material from the class consisting of vinyl acetate and methyl vinyl ketone, from about 15 to about 50 volume percent of a material from the class consisting of acrylic acid and methacrylic acid, from about 2 to about 5 weight percent based on monomer content of methyl ethyl ketone peroxide, about 2 weight percent based on monomer content of cobalt naphthenate, and from about 5 to about 10 weight percent based on monomer content of ethyl cellulose sorbate.

References Cited in the file of this patent

UNITED STATES PATENTS

| | | |
|---|---|---|
| 1,933,052 | Fikentscher et al. | Oct. 31, 1933 |
| 2,010,188 | Hagedorn et al. | Aug. 6, 1935 |
| 2,117,321 | Hill | May 17, 1938 |
| 2,129,668 | Barret et al. | Sept. 13, 1938 |
| 2,137,377 | Bauer et al. | Nov. 22, 1938 |